United States Patent [19]

Hoffman et al.

[11] 3,926,833

[45] Dec. 16, 1975

[54] PREPARATION OF MIXED CHLOROHYDRIDES OF ALUMINUM

[75] Inventors: Doyt K. Hoffman; Ricardo O. Bach, both of Gastonia, N.C.

[73] Assignee: Lithium Corporation of America, New York, N.Y.

[22] Filed: Mar. 21, 1973

[21] Appl. No.: 343,266

[52] U.S. Cl. ................ 252/188; 423/299; 423/347; 423/472; 423/495
[51] Int. Cl.$^2$ ........................ C01B 6/06; C01F 7/56
[58] Field of Search .............. 252/188, 105; 149/87; 423/472, 495, 644, 645, 111

[56] References Cited
UNITED STATES PATENTS

| | | | |
|---|---|---|---|
| 2,468,260 | 4/1949 | Gibb .................................... | 423/119 |
| 2,576,311 | 11/1951 | Schlesinger ......................... | 252/188 |
| 3,076,047 | 1/1963 | Seubold .......................... | 260/683.15 |
| 3,346,506 | 10/1967 | Beumel ............................... | 252/188 |
| 3,355,262 | 11/1967 | Beaird ................................. | 423/644 |
| 3,495,956 | 2/1970 | Roberts ........................... | 423/472 X |
| 3,639,104 | 2/1972 | Ashby .................................. | 423/644 |
| 3,812,244 | 5/1974 | Schmidt ............................... | 423/645 |

FOREIGN PATENTS OR APPLICATIONS

| | | | |
|---|---|---|---|
| 645,706 | 1964 | Belgium .............................. | 423/472 |
| 823,496 | 11/1959 | United Kingdom .................. | 423/645 |

OTHER PUBLICATIONS

M. Ferles: "Aluminum Hydride and Aluminum Chloride Hydride in Organic Chemistry", *Chem. Listy,* 62(9), 1968, pp. 1045–1065.

*Primary Examiner*—Dennis E. Talbert, Jr.
*Assistant Examiner*—Dennis L. Albrecht
*Attorney, Agent, or Firm*—Wallenstein, Spangenberg, Hattis & Strampel

[57] ABSTRACT

Preparation of mixed chlorohydrides of aluminum, especially $AlH_2Cl$, particularly in a solvent system comprising primarily dimethyl ether of ethylene glycol, by a reaction between, for instance, 1 mole of aluminum chloride with 2 to 4 moles of lithium hydride in the presence of an ethylene glycol ether such as diethylene glycol dimethyl ether, and desirably also in the presence of a liquid hydrocarbon such as benzene or toluene. The mixed chlorohydrides of aluminum are useful as reducing agents in various reducing reactions.

16 Claims, No Drawings

PREPARATION OF MIXED CHLOROHYDRIDES OF ALUMINUM

Our invention is directed to the novel preparation of highly advantageous mixed chlorohydrides of aluminum, particularly in the form of high-boiling ether, notably, polyethylene glycol alkyl ether, solutions, which can be used effectively as selective hydrogenating and reducing agents, particularly in organic reactions of various types.

It has been well known heretofore to use $AlH_3$ as a selective hydrogenating and reducing agent in various organic reactions. Various methods for the production of $AlH_3$ and various uses thereof have heretofore been disclosed. One of such methods involves a two-step procedure, starting with LiH, wherein the latter is initially reacted with $AlCl_3$ in the presence of certain ethers, notably, diethyl ether, to produce lithium tetrahydridoaluminate or lithium aluminum hydride ($LiAlH_4$), and the latter is then reacted with $AlCl_3$ in the presence of certain ethers, usually diethyl ether. Solutions of $AlH_3$ in ethers are quite unstable. This is particularly the case where the ether is diethyl ether (DEE). Somewhat more stability occurs where the ether is dimethyl ether (DME) or a cyclic ether such as tetrahydrofuran (THF). The "glymes", which are mono-, di-, tri- and tetraethylene glycol dimethyl ethers, have been found to give very stable solutions.

Another heretofore known procedure for preparing $AlH_3$, starting with $LiAlH_4$, involves reacting the latter with a tertiary amine hydrochloride in the presence of an ether. Such reactions cannot satisfactorily be carried out in liquid hydrocarbon media because of the lack of solubility of the $LiAlH_4$ in such media. However, tertiary amine complexes ($AlH_3 \cdot NR_3$) can be isolated from the reaction of the $LiAlH_4$ with the tertiary amine hydrochloride in the presence of an ether, and said complexes can be dissolved in liquid aromatic hydrocarbons such as benzene.

Certain of the aforesaid procedures for the preparation of $AlH_3$, and reducing organic reactions in which $AlH_3$ is used, are shown in Ber. 75, 2003 (1942); J. Am. Chem. Soc. 69, 1199 (1947); J. Am. Chem. Soc. 77, 3164 (1955); German Pat. Nos. 1,024,062; 1,039,041 and 1,141,623; J. Am. Chem. Soc. 88, 1464 (1966) and J. Am. Chem. Soc. 90, 2927 (1968).

It has also been known that tertiary amines, for instance, trimethylamine (TMA), stabilize $AlH_3$ in its solutions, the addition of TMA to ethereal solutions of $AlH_3$ leading to the formation of complexes such as $AlH_3 \cdot N(CH_3)_3$, as indicated above and as obtained by various alternative procedures. J. Am. Chem. Soc. 83, 535 (1961).

It has also heretofore been disclosed, as shown in British Pat. No. 823,496, in connection with the production of high purity silicon from silicon tetrachloride ($SiCl_4$), to react the $SiCl_4$ with an aluminum-containing hydride, such as $LiAlH_4$, in a medium comprising a dialkyl ether of a polyethylene glycol, such as dimethyl ether of tetraethylene glycol. This reaction results in reducing the $SiCl_4$ to $SiH_4$ which, in turn, is thermally decomposed to high purity silicon.

$LiAlH_4$ and $NaAlH_4$ are effective selective reducing agents, various functional groups being reduced efficiently while aromatic and ethylenic double bonds remain largely unaffected. However, due to the high cost of producing, and the resultant necessary high selling price, of such reducing agents, in terms of dollars per pound of active hydrogen, efforts have been made to find reducing agents which are effective but which provide more economical sources of active hydrogen than the tetrahydridoaluminates. Such efforts have also been directed to overcoming the serious restriction on the utilization of $LiAlH_4$ due to the fact that there are only limited types of solvent media in which it may be employed. Thus, as indicated above, nonpolar liquid solvent media such as hydrocarbons, while desirable as media in which to carry out various reducing organic reactions, generally cannot be utilized.

Compounds exemplified by diisobutylaluminum hydride, $HAl(C_4H_9)_2$, are soluble in various liquid hydrocarbons and can be used as reducing agents but their cost, in terms of active hydrogen per pound, is quite high.

Sodium bis (2-methoxy ethoxy) dihydridoaluminate, $NaAl(OCH_2CH_2OCH_3)_2H_2$, in the form of 70% solution in benzene (U.S. Pat. No. 3,507,895) has been suggested for use as a reducing agent for various organic reactions. However, it has a very low active hydrogen content, the price is high and, in addition, its use introduces certain undesirable aspects in certain types of reducing reactions.

Still another type of compound, exemplified by sodium diethyl dihydridoaluminate, $NaAl(C_2H_5)_2H_2$, has been offered for sale in the form of a 25% solution in xylene for use as a reducing agent. As in the case of sodium bis (2-methoxy ethoxy) dihydridoaluminate, the presence of an alkali metal ion has to be taken care of in the workup after the reducing reaction although the cost of the active hydrogen per pound is materially less than in the case of the others of said reducing agents referred to above. Furthermore, the basicity of the hydrolyzed product solutions is a disadvantage where sensitive groupings such as aldehydes or ketones are present in the desired product.

In accordance with our invention, solutions of mixed chlorohydrides of aluminum in liquid solutions can be prepared which exhibit good stability and which provide active hydrogen at a relatively low cost per unit weight.

In the practice of our invention, LiH and $AlCl_3$ are reacted in a mole ratio in the range of about 1 to 4 of LiH to 1 of $AlCl_3$ in a solvent mixture of a liquid hydrocarbon medium, particularly benzene or toluene, and in a dialkyl ether of ethylene glycol or a polyethylene glycol, particularly the dimethyl ether of ethylene glycol (hereafter designated MG). The optimum mole ratio of LiH to $AlCl_3$ depends, generally, on the particle size of the LiH, the amount of dialkyl ether of the ethylene glycol or of the polyethylene glycol employed, and the reaction time. The particle size of the LiH is variable, the finer the size the more rapid, generally, the rate of reaction. A particle size of commercial −35 mesh LiH gives a satisfactory conversion rate, but particle sizes of −100 mesh result in a faster and more complete conversion. The volume ratio of the dialkyl ether of the ethylene glycol or polyethylene glycol to the liquid hydrocarbon in the reaction mixture is variable but, generally, it is desirably from 1 to 4 of said ether to 1 of the liquid hydrocarbon, but, in the broader aspects of our invention, the reaction can be carried out in the absence of the liquid hydrocarbon. Generaly speaking, at the lower ratios of the said ether to the liquid hydrocarbon, the rate and extent of the reaction are decreased. The reactants are utilized, or adjusted during the reaction, so that the final concentration of the $AlH_xCl_{3-x}$, where $x$ is 0 and up to but not including 3, is advantageously between about 0.1 and 2 moles per liter of solution.

The dialkyl ethers of the ethylene glycol or of the polyethylene glycols which are utilized are those having a basicity such as to enable the replacement of the chlorine in the $AlCl_3$, or other halogen of the aluminum trihalide used, by hydrogen from the LiH, or other alkali metal hydride used, so as to produce $AlH_2Cl$ or $AlHCl_2$, as the case may be. Generally speaking, the glycols and polyglycols, of which the dialkyl ethers are utilized, will contain from 2 to 8 carbon atoms; and the alkyl groups of the dialkyl ethers of said glycols and polyglycols will each contain from 1 to 3 carbon atoms. Typical examples of said glycols and polyglycols are ethylene glycol, propylene glycol, diethylene glycol, triethylene glycol, tetraethylene glycol and dipropylene glycol. The alkyl radicals may be methyl, ethyl, propyl and isopropyl. Examples of the dialkyl ethers are, thus, dimethyl ether of ethylene glycol; dimethyl ether of propylene glycol; dimethyl ethers and diethyl ethers of diethylene glycol, triethylene glycol and tetaethylene glycol; and dipropyl and diisopropyl ethers of the aforementioned glycols and polyglycols.

It may be noted that the dialkyl ethers of the glycols and polyglycols act as Lewis bases to complex with and solubilize $AlCl_3$. This reaction is very exothermic and, therefore, should be carried out under controlled conditions. One illustrative way of controlling the reaction is to slurry the $AlCl_3$ in the liquid hydrocarbon and then add the selected dialkyl ether of the ethylene glycol or polyethylene glycol slowly until enough has been added to complex the $AlCl_3$. This, however, generally produces a waxlike solid which presents certain difficulties in handling due to the insolubility of the complex in the liquid hydrocarbon.

It is particularly desirable, therefore, to effect a control of the reaction in the following manner. Since the dimethyl ether (DME) complex of $AlCl_3$ is soluble in aromatic hydrocarbons and is readily formed by purging DME into a stirred $AlCl_3$-liquid hydrocarbon slurry, the resulting solution is then used to prepare a solution of the dialkyl ether of the ethylene glycol or polyethylene glycol or to carry out the reaction directly in said dialkyl ether. Since said dialkyl ethers are stronger Lewis bases and have boiling points much higher than that of DME, the DME will be expelled from the dialkyl ether solutions at room temperatures.

Another manner in which to effect a control of the reaction is to prepare, as a first step in the reaction, a mixed salt composed of $AlCl_3$ and either LiCl or NaCl. These salt combinations can be prepared by melting the 1:1 mole mixture together at about 100°C. After cooling, this material can then advantageously be dissolved in the selected dialkyl ether of the ethylene glycol or polyethylene glycol for the preparation of the mixed chlorohydride.

The reaction between the LiH and the $AlCl_3$, which generally results in the production of chlorodihydroaluminate, is carried out by suspending the LiH in a flask containing the dialkyl ether of ethylene glycol or polyethylene glycol, in an inert atmosphere, by slowly adding the $AlCl_3$ solution. The heat of the reaction is removed either by ambient air or by a cooling bath. Generally, where the dialkyl ether is MG, the reaction proceeds to the replacement of 2 atoms of chlorine whereby to produce $AlH_2Cl$, even when a 1 mole excess of LiH is used in one stage, i.e., 3 LiH to 1 $AlCl_3$.

By-product LiCl remains in solution up to about 1 molar (Li: Al$\cong$2). Above this ratio, unsolvated LiCl precipitates.

When dimethyl ethers of di-, tri-, or tetraethylene glycol are used instead of the dimethyl ether of ethylene glycol, the conversion of the $AlCl_3$ is generally to $AlHCl_2$. The addition of fresh LiH in small increments does not result in carrying the conversion to, or approaching, $AlH_3$. However, where the dimethyl ether of ethylene glycol is used, the addition of fresh LiH in small increments pushes the reaction to, or approaching, the production of $AlH_3$.

In the practice of the invention, it is particularly advantageous to utilize, as an initiator in the reaction between the LiH and the $AlCl_3$, a small amount of proportion of preformed $AlH_3$ or an alkali metal tetrahydridoaluminate such as $LiAlH_4$ or $NaAlH_4$. Small proportions of such initiators, when employed, are utilized, generally of the order of about 0.5 to 5% by weight of the LiH used in the reaction.

While, as pointed out above, benzene or toluene, or mixtures thereof, are especially satisfactory liquid hydrocarbons for use as the hydrocarbon reaction medium, other liquid hydrocarbons can be used illustrative examples of which are cyclohexane, isooctane, o-, m- and p-xylenes and mixtures of two or more of them, methylbenzene, isopropylbenzene, diethylbenzene and the like. Generally, liquid aromatic hydrocarbons are particularly preferred.

It is particularly desirable to utilize LiH as the starting alkali metal hydride. However, it is also within the scope of our invention to use other alkali metal hydrides as, for example, NaH, KH, CsH and RbH. Similarly, where alkali metal tetrahydridoaluminates are used as initiators, the alkali metal can be, in addition to Li or Na, K, Cs and Rb.

While $AlCl_3$ is most advantageously used in the reaction with the alkali metal hydride to produce the mixed chlorohydrides of aluminum in accordance with the present invention, $AlBr_3$ as well as $AlI_3$ can be used in place thereof.

The following examples are illustrative of the practice of our present invention. It will be understood that procedural variations may be made in the light of the guiding principles and teachings disclosed herein. All temperatures recited are in degrees C.

EXAMPLE 1

A 1-liter, 3-neck, round-bottom flask is fitted with a 250 ml dropping funnel, an argon purge inlet with thermometer, a water condenser attached to an oil bubbler, and a magnetic stirrer. After thoroughly purging the apparatus, 12 g of −100 mesh LiH (1.5 moles) and 500 ml of distilled MG are placed in the flask together with 0.3 g of preformed $LiAlH_4$ as an initiator. Then an $AlCl_3$ solution, prepared from a slurry of 66 g $AlCl_3$ (0.5 moles) in 150 ml of distilled toluene by slowly purging ~25 g DME (~0.5 moles) thereinto, is slowly dripped into the stirred slurry of the LiH in the MG in the flask over about 1 hour. The rate of addition is such as to maintain the temperature in the range of 40°–50°. The DME escapes as the $AlCl_3$ solution comes into contact with the MG. The reaction mixture is stirred for an additional 2.5 hours after the addition of the $AlCl_3$ solution is completed. The reaction mixture is then filtered, and an aliquot of the solution is hydrolyzed and the evolved hydrogen measured. The conversion is about 92% as $AlH_2Cl$ based on the $AlCl_3$ used, or 61% based on the LiH used. It may be noted that the unreacted LiH is not lost and, if desired, it can be recycled for further use.

EXAMPLE 2

Example 1 is repeated with the following modification: the order of addition is reversed so that the LiH is added incrementally to the $AlCl_3$ solution in MG. The conversion is 95% to $AlH_2Cl$ based on $AlCl_3$, and 65% based on LiH.

EXAMPLE 3

Example 1 is repeated but using 14.3 g −35 mesh LiH (1.8 moles), and the reactants are stirred for about 6 hours and then filtered. The conversion is about 94% to $AlH_2Cl$ based on $AlCl_3$.

EXAMPLE 4

Into the apparatus of Example 1 are placed 12 g of LiH (1.5 moles) (−100 mesh), 66 g of $AlCl_3$ (0.5 moles) and 100 ml of toluene. MG is then added dropwise with constant agitation. However, as the MG is added the solids become very bulky and difficult to stir. Additional MG is then added up to a total of 600 ml and the solids begin to dissolve with the formation of $AlHCl_2$ in solution. The conversion is 75% to $AlH_2Cl$ in about 16 hours.

EXAMPLE 5

The filtered solution from Example 1 is treated with 6 g of −100 mesh LiH for 12 hours. The resulting solution contains Al, H and Cl (bound to Al) in the following ratio: 1:2.6:0.4. This shows that the replacement of the third chlorine on aluminum is much more difficult than the first and second step with MG solvent.

EXAMPLE 6

Example 1 is repeated except that diethylene glycol dimethyl ether (DG) is used in place of MG. The conversion is 100% to $AlHCl_2$ based on $AlCl_3$.

EXAMPLE 7

EXAMPLE 1 is repeated except that tetraethylene glycol dimethyl ether (TG) is used in place of MG. The conversion is 98% to $AlHCl_2$ based on $AlCl_3$.

A sample of the above solution is treated with an amount of LiH which, stoichiometrically, would be sufficient to react with the remaining chloride and to convert it to $AlH_3$. Stirring for 16 hours does not significantly increase the hydride content above $AlHCl_2$.

EXAMPLE 8

24 g of NaH (1 mole) are reacted with a mixture consisting of 29 g NaCl (0.5 mole) and 66 g $AlCl_3$ (0.5 mole) contained in 300 ml of MG, under the conditions described in Example 1, to produce 23 g of $AlH_2Cl$ (0.36 moles) in 300 ml of solution containing excess NaCl for a conversion of 72%.

EXAMPLE 9

Example 8 is repeated but using 8 g LiH (1 mole) and 21 g LiCl (0.5 mole) plus 66 g $AlCl_3$ (0.5 mole) to produce 32 g of $AlH_2Cl$ (0.5 mole).

Mixed aluminum chlorohydride solutions made in accordance with our present invention have highly effective utility in various organic reactions, notably as reducing agents. In certain cases, inorganic reactions are substantially quantitative without the formation of undesirable byproducts. For instance, $SiCl_4$ is transformed essentially quantitatively to $SiH_4$; and $PCl_3$ is converted to $PH_3$ in, generally 30 to 50% conversion in accordance with the following equations, respectively:

1. $SiCl_4 + 2AlH_2Cl \rightarrow SiH_4 + 2AlCl_3$
2. $SiCl_4 + 4AlHCl_2 \rightarrow SiH_4 + 4AlCl_3$
3. $2PCl_3 + 3AlH_2Cl \rightarrow 2PH_3 + 3AlCl_3$
4. $PCl_3 + 3AlHCl_2 \rightarrow PH_3 + 3AlCl_3$ Silicon chlorohydrides can also effectively be produced using the chlorohydrides made in accordance with our invention.

Illustrative examples of the uses of the mixed chlorohydrides of aluminum of our invention are set forth below.

EXAMPLE 10

Preparation of $SiH_4$ by Reduction of $SiCl_4$ with $AlH_2Cl$

A 250 ml, 3-neck flask is fitted with an argon inlet tube, a 250-ml dropping funnel and a dry-ice condenser and outlet connection. Into the flask is placed 100 ml of a MG solution containing 20 millimoles of $AlH_2Cl$. Through the dropping funnel, 8 millimoles of $SiCl_4$ are slowly admitted to the flask at room temperature and with constant stirring provided by a magnetic stirrer and stirring bar. The evolved gas is allowed to pass from the reaction through the condenser and into a tared section of Vycor tubing; the tubing is packed with glass wool on each end and heated to a dull-red glow. The deposited silicon, determined by weight difference, 210 mg, for a yield of crude silane of 94% based on $SiCl_4$ used.

In addition, the above solution, now containing essentially $AlCl_3$, is treated with 0.32 g of LiH by stirring together for 2 hours and then filtering. The resulting solution contains about 20 millimoles of $AlH_2Cl$.

As the above reaction is carried out, the active hydrogen species in solution passes from $AlH_2Cl$ through $AlHCl_2$ and eventually would have gone to $AlCl_3$ had sufficient $SiCl_4$ been added. Hence, it is apparent that either form of the mixed chloraluminum hydride may be used to prepare $SiH_4$ under these conditions and in excellent yield as long as the appropriate stoichiometries are observed.

EXAMPLE 11

Preparation of $SiH_2Cl_2$

Dichlorosilane may be prepared by a generally similar method to the above example. However, since $SiH_4$ is formed so rapidly and completely, the reaction must be carried out so that a deficiency of active hydrogen reducing agent is present in the reaction. (Hence, an inverse addition method is used.) In addition, cooling to low temperatures, e.g., about 0°C, is advantageous.

10 millimoles of $SiCl_4$ is placed in a flask and 100 ml of an MG solution containing 20 millimoles of $AlH_2Cl$ is placed in the dropping funnel. The flask is cooled to 0°. The MG solution is then added slowly with stirring and any evolved gas is collected and decomposed in a gas impinger containing alcoholic KOH. After stirring for 30 minutes, a fresh impinger and solution of alcoholic KOH is used to catch the fraction of gas evolved when the dry-ice condenser is replaced by a water-cooled condenser and the reaction mixture heated to 35°.

The two fractions of product collected in the impingers are analyzed for silicon and chloride to determine the composition of gaseous products. In the first fraction, $SiH_4$ accounts for about 70% of the total silicon collected, while, in the second fraction, $SiH_2Cl_2$ is the empirical composition accounting for the remaining 30%.

While, as indicated above, the halohydrides of aluminum will generally correspond to the formulae $AlH_2Cl$ and $AlHCl_2$, the contents of halogen and hydrogen can vary, the atoms of halogen and hydrogen per simplified molecule adding up to 3, illustrative examples of such halohydrides of aluminum being exemplified by formulae such as $AlH_{0.5}Cl_{2.5}$, $AlH_{1.5}Cl_{1.5}$, etc. Thus, said halohydrides of aluminum can be represented by the formula $AlH_nCl_m$ where hydrogen and chlorine are present in the molecule and where the sum of $n$ and $m$ is 3.

We claim:

1. In a method of preparing liquid solutions of aluminum compounds corresponding to the formula $AlH_x$-$Hal_{3-x}$ where $x$ is 0 and up to but not including 3, the steps which comprise reacting an alkali metal hydride with $AlHal_3$, where Hal is halogen selected from the group consisting of chlorine, bromine and iodine, in a mole ratio of about 1 to 4 moles of said alkali metal hydride to 1 mole of said $AlHal_3$, in a liquid medium comprising a dialkyl ether of a glycol selected from the group consisting of ethylene glycol, propylene glycol and their polyglycols, said glycol containing from 2 to 8 carbon atoms, the alkyls of said dialkyl radical containing from 1 to 3 carbon atoms, whereby to produce a final concentration between about 0.1 and 2 moles of the $AlH_xHal_{3-x}$ per liter in said solutions.

2. The method of claim 1, in which the liquid medium also includes a liquid aromatic hydrocarbon, the volume ratio of said dialkyl ether to said hydrocarbon being from 1 to 4 of said dialkyl ether to 1 of said hydrocarbon.

3. The method of claim 2, in which the alkali metal hydride is lithium hydride, and Hal is chlorine.

4. The method of claim 3, in which the liquid hydrocarbon is at least one member selected from the group consisting of benzene and toluene.

5. The method of claim 4, in which there is included in the reaction mixture an initiator in the form of at least one member selected from the group consisting of a preformed $AlH_3$ and an alkali metal tetrahydridoaluminate, said initiator being utilized in amounts of about 0.5 to 5% by weight of the lithium hydride.

6. The method of claim 1, in which the alkyl groups of said dialkyl ether are methyl.

7. The method of claim 4, in which the alkyl groups of said dialkyl ether are methyl.

8. In a method of preparing liquid aromatic hydrocarbon solutions of mixed chlorohydrides of aluminum, the steps which comprise:
  a. providing a slurry of LiH in a dialkyl ether of a member selected from the group consisting of ethylene glycol, diethylene glycol, triethylene glycol and tetraethylene glycol and in which each alkyl contains from 1 to 2 carbon atoms,
  b. providing a solution of $AlCl_3$ in at least one liquid aromatic hydrocarbon selected from the group consisting of benzene and toluene, said solution also containing dimethyl ether, the volume ratio of said dialkyl ether to said hydrocarbon being from 1 to 4 of said dialkyl ether to 1 of said hydrocarbon,
  c. the ingredients being proportioned so that the mole ratio of LiH to $AlCl_3$ in the (a) and (b) compositions is about 1 to 4 of LiH to 1 of $AlCl_3$, and
  d. gradually adding the (b) solution to the (a) slurry, whereby to produce a final concentration between about 0.1 and 2 moles per liter of the mixed chlorohydrides of aluminum in said solutions.

9. In a method of preparing liquid solutions of mixed chlorohydrides of aluminum, the steps which comprise:
  a. providing a slurry of LiH in a dialkyl ether of a member selected from the group consisting of ethylene glycol, diethylene glycol, triethylene glycol and tetraethylene glycol and in which each alkyl contains from 1 to 2 carbon atoms,
  b. providing a solution of $AlCl_3$ and NaCl or LiCl in a substantially 1:1 molar ratio in a dialkyl ether of a glycol selected from the group consisting of ethylene glycol, propylene glycol and their polyglycols, said glycol containing from 2 to 8 carbon atoms, the alkyls of said dialkyl radical containing from 1 to 3 carbon atoms,
  c. The ingredients being proportioned so that the mole ratio of LiH to $AlCl_3$ in the (a) and (b) compositions is about 1 to 4 of LiH to 1 of $AlCl_3$, and
  d. gradually adding the (b) solution to the (a) slurry, whereby to produce a final concentration between about 0.1 and 2 moles per liter of the mixed chlorohydrides of aluminum in said solutions.

10. The method of claim 8, in which said (a) slurry also contains an initiator in the form of at least one member selected from the group consisting of a preformed $AlH_3$ and an alkali metal tetrahydridoaluminate, said initiator being utilized in amounts of about 0.5 to 5% by weight of the LiH.

11. The method of claim 8, in which during step (d) at least a part of the dimethyl ether is allowed to evaporate from the reaction mixture.

12. The method of claim 9, in which said (a) slurry also contains an initiator in the form of at least one member selected from the group consisting of a preformed $AlH_3$ and an alkali metal tetrahydridoaluminate, said initiator being utilized in amounts of about 0.5 to 5% by weight of the LiH.

13. The method of claim 6, in which the alkyl groups of said dialkyl ether are methyl.

14. A solution of a halohydride of aluminum in a liquid aromatic hydrocarbon solvent and a dialkyl ether of a glycol selected from the group consisting of ethylene glycol, propylene glycol and their polyglycols, said glycol containing from 2 to 8 carbon atoms, the alkyls of said dialkyl radical containing from 1 to 3 carbon atoms, said solution containing from about 0.1 to 2 moles of said halohydride of aluminum per liter, said halohydride corresponding to the formula $AlH_nCl_m$ where the sum of n and m is 3, and also halo of said halohydride being selected from the group consisting of chlorine, bromine, and iodine.

15. A solution according to claim 14, in which the alkyl groups of said dialkyl ether are methyl groups.

16. A solution according to claim 15, in which the aromatic hydrocarbon solvent is a member selected from the group consisting of benzene and toluene.

* * * * *